March 7, 1939.  H. A. KNOX  2,149,297
SUSPENSION FOR VEHICLES
Filed Sept. 20, 1937  2 Sheets-Sheet 1
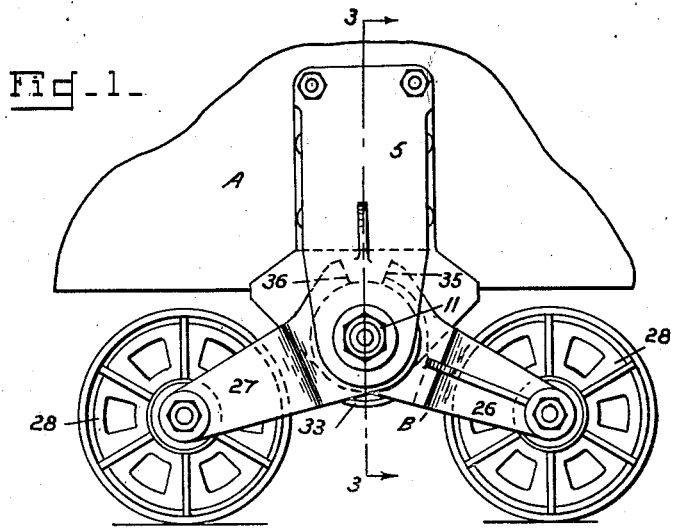
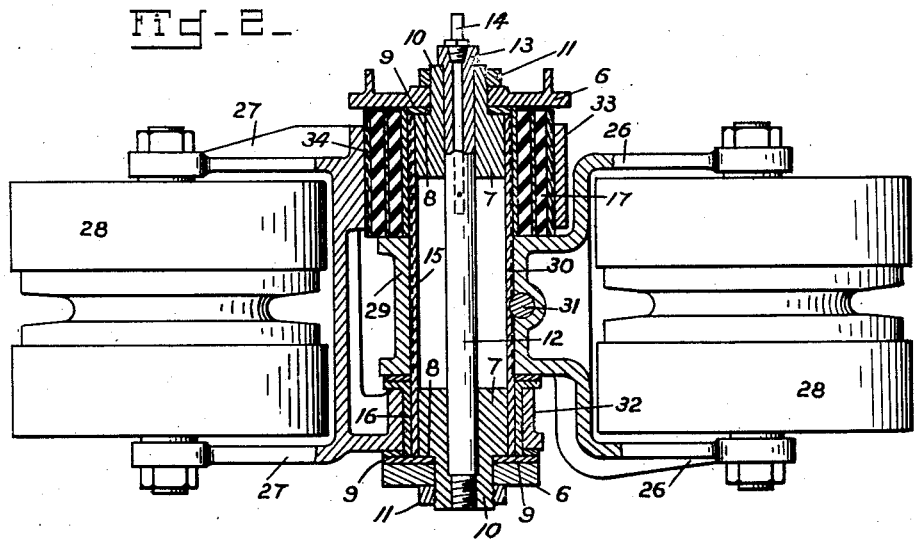
Inventor
Harry A. Knox
By W. N. Roach
Attorney

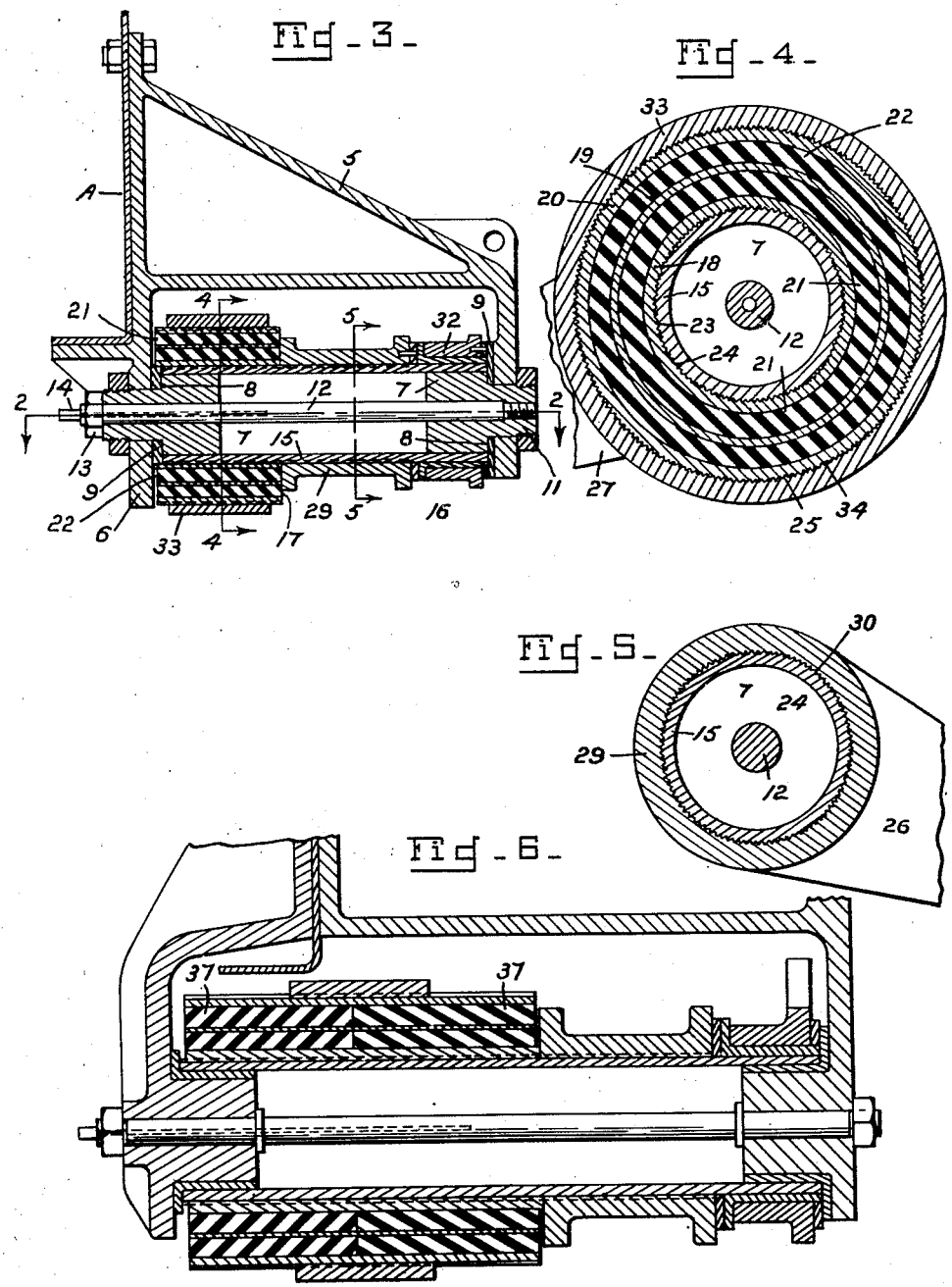

Patented Mar. 7, 1939

2,149,297

UNITED STATES PATENT OFFICE 2,149,297

SUSPENSION FOR VEHICLES

Harry A. Knox, Washington, D. C.

Application September 20, 1937, Serial No. 164,747

3 Claims. (Cl. 267—21)

(Granted under the act of March 3, 1883, as amended April 30, 1928; 370 O. G. 757)

The invention described herein may be manufactured and used by or for the Government for governmental purposes, without the payment to me of any royalty thereon.

The subject of this invention is a suspension for vehicles.

The purpose of the invention is to provide a vehicle suspension in which the load is yieldingly supported by means of a torque resisting resilient bushing which flexes to permit angular motion of oscillatable arms carrying wheels.

The invention consists more particularly in a simple and compact structure having a novel arrangement of elements whereby the oscillatable arms and the resilient bushing may be quickly and easily assembled.

To these and other ends, the invention consists in the construction, arrangement and combination of elements described hereinafter and pointed out in the claims forming a part of this specification.

Practical embodiments of the invention are illustrated in the accompanying drawings, wherein:

Fig. 1 is a view in side elevation of a suspension unit constructed in accordance with the invention.

Fig. 2 is a sectional view on the line 2—2 of Fig. 3.

Fig. 3 is a sectional view on the line 3—3 of Fig. 1.

Figs. 4 and 5 are sectional views on the corresponding lines of Fig. 3.

Fig. 6 is a sectional view showing a modification of the invention.

Referring to Figs. 1 to 5 there is shown a portion of a vehicle A which is adapted to be supported by a plurality of units B, only one of which is shown. Each unit consists of a bracket or support 5 fixed to the side of the vehicle and including spaced vertical walls 6—6 each of which carries one of a set of aligned studs 7—7. Each stud has an enlarged inner end forming a shoulder 8 for engaging a rubbing plate 9 and a reduced outer end 10 passing through its respective wall and threaded to receive a nut 11 which when turned down against the wall firmly clamps the stud in place. A rod 12 threaded in the outer stud passes through the inner stud and has a projecting end carrying a head 13 and a fitting 14 for introducing lubricant through the rod and to the space between the studs.

A supporting sleeve 15 journaled on the studs between the rubbing plates 9—9, carries a metallic or non-resilient bushing 16 on its outer end, while on its inner end it carries a resilient bushing 17 (Fig. 3) which represents any form of torque resisting element. The particular resilient bushing shown (Fig. 4) consists of spaced concentric metal sleeves 18, 19, and 20 and concentric tubes 21 and 22 of elastic material such as rubber which are inserted between the sleeves and immovably secured to the sleeves as by vulcanization. The elastic tubes preferably possess different degrees of flexibility, the inner tube being the least flexible. This difference in flexibility may be secured by the character or the thickness of the material.

The inner metal sleeve 18 is formed internally with longitudinally extending serrations 23 which engage corresponding serrations 24 formed externally on the supporting sleeve 15. The outer sleeve 20 is likewise provided externally with serrations 25.

A pair of arms 26 and 27, each carrying one of a pair of similar wheels 28—28, have the sleeve 15 as a common axle. The arm 26 is formed with a single hub or bearing 29 which is mounted on the central portion of the sleeve 15 and has internal serrations 30 engaging the serrations 24 on the sleeve. A pin 31 engaging both the bearing 29 and the sleeve 15 holds the arm 26 against lateral displacement.

The arm 27 is formed with a pair of spaced bearings, the outer bearing 32 mounted on the non-resilient bushing 16 and the inner bearing 33 mounted on the resilient bushing 17. The bearing 33 has internal serrations 34 which engage the external serrations 25 on the sleeve 20.

The arms 26 and 27 are provided respectively with stop members 35 and 36 which are adapted to engage to limit angular movement of the arms.

In the modification shown in Fig. 6 the structure has been modified to carry two resilient bushings 37—37.

The weight of the vehicle normally tends to lower the supporting sleeve 15 and by reference to Figs. 4 and 5 this has the effect of angularly moving the sleeve 15 and bearing 29 in a counter-clockwise direction and angularly moving the sleeve 20 and bearing 32—33 in a clockwise direction. The movement of these members and the arms 26 and 27 is permitted through flexure of the concentric elastic tubes 21 and 22 which provide a yielding and resilient suspension for the vehicle.

I claim:

1. A vehicle suspension embodying a support adapted to be carried by a vehicle, a sleeve rotatably mounted on the support and having serrations over a portion of its external surface, a bushing on one end of the rotatable sleeve, said bushing formed of an inner sleeve having internal serrations engaging the serrations of the rotatable sleeve, an outer sleeve having external serrations, elastic material between and secured to the inner and outer sleeves, a pair of oppositely extending arms, one arm having a bearing with serrations engaging the serrations of the rotatable sleeve, the other arm having a bearing with serrations engaging the serrations on the outer sleeve of the bushing.

2. A vehicle suspension embodying a fixed support adapted to be carried by a vehicle, a support embracing and rotatably mounted on the fixed support, a torque resisting resilient bushing fixed on the rotatable support, a pair of oppositely extending arms, one arm having a bearing embracing and fixed to the rotatable support and the other arm having a bearing fixed to the bushing and a bearing rotatably mounted relative to the rotatable support.

3. In a joint, a rotatable support, a bushing fixed on the support, said bushing formed of concentric sleeves and concentric tubes of elastic material between the sleeves and immovably secured thereto, a pair of relatively movable arms having the support as their axis, one of the arms having one portion fixed to the outer sleeve of the bushing and another portion rotatably mounted on the support, the other arm fixed to the support.

HARRY A. KNOX.